United States Patent
Fricker et al.

(10) Patent No.: US 10,101,146 B2
(45) Date of Patent: Oct. 16, 2018

(54) METHOD AND DEVICE FOR THE SENSOR-FREE POSITION DETERMINATION OF AN ELECTRONICALLY COMMUTATED ELECTRIC MACHINE

(75) Inventors: David Fricker, Oberhoffen sur Moder (FR); Alexander Reiss, Schaffhouse pres Seltz (FR)

(73) Assignee: Robert Bosch GmbH, Stuttgart (DE)

( * ) Notice: Subject to any disclaimer, the term of this patent is extended or adjusted under 35 U.S.C. 154(b) by 900 days.

(21) Appl. No.: 13/811,406

(22) PCT Filed: Jul. 18, 2011

(86) PCT No.: PCT/EP2011/062190
§ 371 (c)(1),
(2), (4) Date: Apr. 3, 2013

(87) PCT Pub. No.: WO2012/010532
PCT Pub. Date: Jan. 26, 2012

(65) Prior Publication Data
US 2013/0207647 A1    Aug. 15, 2013

(30) Foreign Application Priority Data
Jul. 22, 2010 (DE) .................. 10 2010 038 295

(51) Int. Cl.
*G01B 7/30* (2006.01)
*H02P 6/182* (2016.01)
*H02P 21/18* (2016.01)

(52) U.S. Cl.
CPC .............. *G01B 7/30* (2013.01); *H02P 6/182* (2013.01); *H02P 21/18* (2016.02)

(58) Field of Classification Search
CPC .......... G01B 7/30; H02P 21/146; H02P 6/182
(Continued)

(56) References Cited

U.S. PATENT DOCUMENTS 4,988,940 A * 1/1991 Reng .................. H02P 21/10
                                                    318/800
5,471,122 A * 11/1995 Bilotti .................. H02P 7/04
                                                    318/284
(Continued)

FOREIGN PATENT DOCUMENTS

EP          1133050 A2      9/2001
EP          1612927 A1      1/2006
(Continued)

OTHER PUBLICATIONS

EP1133050, Sakamoto et al, Method of estimating a rotor position of synchrnous motor, methods of controlling synchronous motor with no position sensor and a controller of synchronous motor, Dec. 9, 2001.*

(Continued)

*Primary Examiner* — Muhammad S Islam
(74) *Attorney, Agent, or Firm* — Michael Best & Friedrich LLP

(57) ABSTRACT

The invention relates to a method for determining a rotor position of a rotatory, multi-phase, electronically commutated electric machine (1). Said electric machine (1) comprises several phase windings (4) which can be supplied with current by means of phase connectors. Said method consists of the following steps: phase currents and phase connections are identified on phase connections of the electric machine (1); the induced currents on the phase connections of the electric machine (1) are determined from the identified phase currents and phase flows; the identified current indicator of the induced current is provided with respect to a Cartesian coordination system which is fixed to a stator by the induced currents; the position of the rotor is identified as a space indicator angle of the current indicator (Continued)

of the induced current provided with respect to the Cartesian coordination system which is fixed to the stator.

13 Claims, 2 Drawing Sheets

(58) Field of Classification Search
USPC ............ 318/400.02, 400.17, 400.32, 400.34
See application file for complete search history.

(56) References Cited

U.S. PATENT DOCUMENTS

| | | | | |
|---|---|---|---|---|
| 6,396,229 | B1* | 5/2002 | Sakamoto | H02P 6/18 318/400.02 |
| 6,498,449 | B1* | 12/2002 | Chen | B62D 5/046 318/434 |
| 6,922,028 | B2* | 7/2005 | Akizuki | H02P 6/20 318/400.04 |
| 7,043,395 | B2* | 5/2006 | Vadstrup | H02P 21/141 702/145 |
| 2007/0120519 | A1* | 5/2007 | Sakamoto | H02P 25/03 318/722 |
| 2009/0190903 | A1* | 7/2009 | Komatsu | B62D 5/046 388/803 |
| 2009/0315492 | A1 | 12/2009 | Oomura | |
| 2010/0060213 | A1* | 3/2010 | Hasegawa | H02P 6/14 318/400.04 |
| 2010/0109584 | A1* | 5/2010 | Kwon | H02P 21/0089 318/400.02 |

FOREIGN PATENT DOCUMENTS

| | | |
|---|---|---|
| JP | 2000152687 | 5/2000 |
| JP | 2002191188 A | 7/2002 |
| JP | 2008193869 | 8/2008 |
| JP | 2009261103 A | 11/2009 |
| JP | 2010029028 A | 2/2010 |

OTHER PUBLICATIONS

International Search Report for Application No. PCT/EP2011/062190 dated Nov. 28, 2012 (3 pages).

* cited by examiner

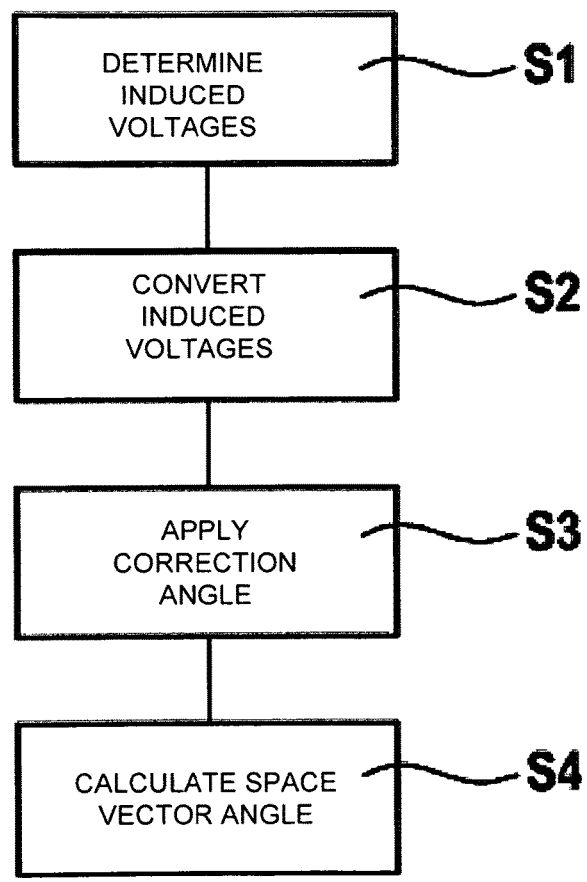

ized electric machine. Electronic commutation is carried out with the aid
METHOD AND DEVICE FOR THE SENSOR-FREE POSITION DETERMINATION OF AN ELECTRONICALLY COMMUTATED ELECTRIC MACHINE

BACKGROUND OF THE INVENTION

The present invention relates to electronically commutated electric machines, in particular methods for the sensor-free position detection of an armature of an electric machine.

Information on the instantaneous armature position is required for electronic commutation of brushless electric machines. Electronic commutation is carried out with the aid of the armature position by virtue of phase voltages being applied to the electric machine depending on the armature position or, in the case of operation in the generator mode, being tapped off at said electric machine.

Various methods for ascertaining the armature position are known. In the case of one group of electric machines, the armature position is detected by an integrated or separate position sensor and made available to the control unit which performs the electronic commutation. In the case of another group of electric machines, the armature position is ascertained without the use of sensors from the motor voltages and/or motor currents.

A known method for sensor-free position detection is the so-called back-emf method, in which an armature position is derived from a profile of the induced voltage in a winding phase of the electric machine. Since it is necessary to switch the corresponding phase connections to the deenergized state in order to measure the induced voltage, restrictions are placed on the choice of suitable energization pattern for the electronic commutation for the use of the back-emf method.

Furthermore, armature position determination with the aid of the back-emf method is generally possible precisely in the case of those electric machines in which the induced voltage describes a sinusoidal profile and the phase voltages are not supplied via an inverter since a phase connection cannot be switched to the deenergized state there. A permanent voltage input (without blanking interval) which is advantageous, for example, for the noise response is not possible with a back-emf method. The quality of known methods for the sensor-free operation of sinusoidal machines such as, for example, in the case of sensor-free, field-oriented regulation decreases the more the profile of the induced voltage deviates from a sinusoidal profile.

SUMMARY OF THE INVENTION

The object of the present invention therefore consists in providing an improved method for the sensor-free detection of the armature position which can also be used when the induced voltages are not sinusoidal and which can be used independently of the type of commutation.

In accordance with a first aspect, a method for ascertaining an armature position of a rotary, polyphase, electronically commutated electric machine is provided. The electric machine has a plurality of phase windings, which can be energized via phase connections. The method comprises the following steps:

determining phase voltages and phase currents at phase connections of the electric machine;

ascertaining the induced voltages at the phase connections of the electric machine from the determined phase voltages and phase currents;

providing the voltage vector of the induced voltage with respect to a stator-fixed Cartesian coordinate system, said voltage vector being determined by the induced voltages;

determining the armature position as a space vector angle of the voltage vector of the induced voltage, which voltage vector is provided with respect to the stator-fixed Cartesian coordinate system.

One concept of the above method consists in that, in the case of polyphase electric machine, the induced voltage in the phase windings is ascertained and is provided as a voltage vector of a stator-fixed coordinate system, with the result that the space vector angle of the induced voltage represents an indication of the armature position or can be associated directly with said armature position. This enables particularly simple derivation of the armature position from the induced voltage.

In particular, the provision of the voltage vector of the induced voltage with respect to the stator-fixed Cartesian coordinate system, said voltage vector being determined by the induced voltages, can be carried out by virtue of the ascertained induced voltages being converted into the stator-fixed Cartesian coordinate system or by virtue of the determined phase voltages and phase currents at the phase connections of the electric machine being converted into the stator-fixed Cartesian coordinate system before the induced voltages are ascertained from said determined phase voltages and phase currents.

Furthermore, a correction angle can be applied to the converted voltage vector of the induced voltage, wherein the correction angle is dependent on the voltage vector angle. In order to ascertain the armature position from the induced voltage even in the case of non-sinusoidal induced voltages, the error in a non-sinusoidal induced voltage when ascertaining the armature position is corrected with the aid of the correction angle.

In accordance with one embodiment, the correction angle can be determined with the aid of the voltage vector angle and/or with the aid of the rotation speed of the armature.

The correction angle can be determined with the aid of a lookup table by inputting the voltage vector angle and/or the rotation speed.

In accordance with a further embodiment, the determination of the phase voltages and phase currents at the phase connections of the electric machine can be carried out by virtue of the phase voltages and phase currents being measured or by virtue of the phase voltages being ascertained from a provided intermediate circuit voltage and a duty factor for a pulse width modulation with which the phase connections are driven.

In accordance with a further aspect, a device for ascertaining an armature position of a rotary, polyphase, electronically commutated electric machine is provided. The electric machine has a plurality of phase windings, which can be energized via phase connections. The device comprises an apparatus for determining phase voltages and phase currents at phase connections of the electric machine;

a control unit, which is designed to ascertain the induced voltages at the phase connections of the electric machine;

to provide the voltage vector of the induced voltage with respect to a stator-fixed Cartesian coordinate system, said voltage vector being determined by the induced voltages; and to determine the armature position as a voltage vector angle of the voltage vector of the induced voltage, which voltage vector is provided with respect to the stator-fixed Cartesian coordinate system.

In accordance with a further aspect, a motor system comprising a rotary, polyphase, electronically commutated electric machine and comprising the above device is provided.

In accordance with a further aspect, a computer program product is provided which contains a program code which, when run on a data processing unit, carries out the following steps in the method:

receiving indications of the phase voltages and phase currents at phase connections of the electric machine;

ascertaining the induced voltages at the phase connections of the electric machine from the received phase voltages and phase currents;

providing the voltage vector of the induced voltage with respect to a stator-fixed Cartesian coordinate system, said voltage vector being determined by the induced voltages; and determining the armature position as a voltage vector angle of the voltage vector of the induced voltage, which voltage vector is provided with respect to the stator-fixed Cartesian coordinate system.

BRIEF DESCRIPTION OF THE DRAWINGS

Preferred embodiments of the present invention will be explained in more detail below with reference to the attached drawings, in which:

FIG. 2 shows a flow chart for illustrating the method for ascertaining the armature position from the induced phase voltage.

DETAILED DESCRIPTION

Figure 1A:
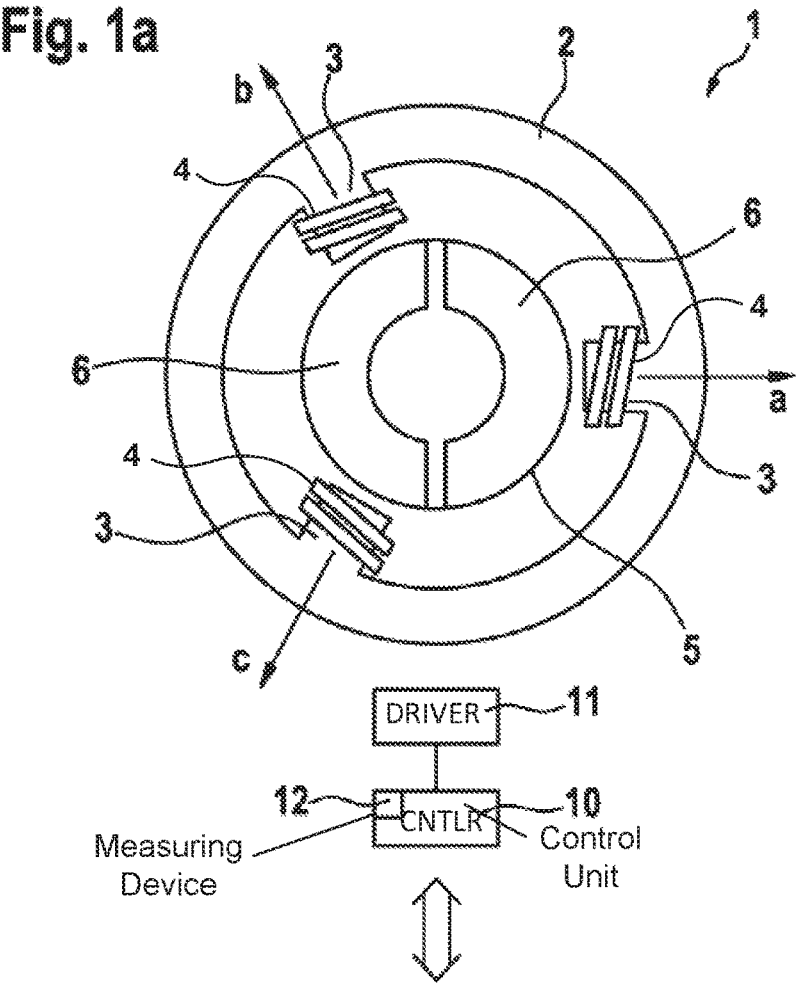
FIG. 1a shows a schematic illustration of a synchronous machine as an example of an electronically commutated electric machine.

FIG. 1 shows a simplified illustration of a three-phase, electronically commutated electric machine 1 as an internal-armature machine. The figure shows a stator 2 with three stator teeth 3 arranged offset through 120° with respect to one another. In practice, the number of stator teeth 3 on the stator 2 is generally greater and, for example, corresponds to a multiple of three, such as nine, twelve or eighteen, for example.

The stator teeth 3 are each provided with a phase winding 4 and, when correspondingly energized, provide a component of the stator magnetic field. The stator windings 4 are conventionally delta-connected or star-connected. Each of the stator windings 4 can be energized via a corresponding phase connection (not shown) of the electric machine 1.

Figure 1B:
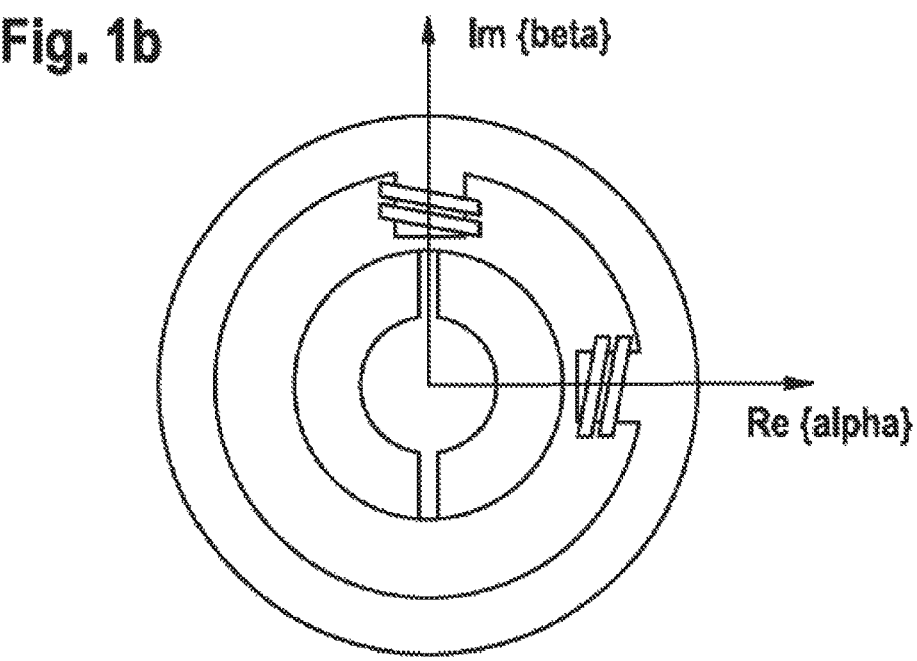
FIG. 1b shows a supplementary illustration illustrating a conversion of the voltage vector of the induced voltage into a stator-fixed Cartesian coordinate system.

A rotor 5, as armature of the electric machine 1, is fitted, with the capacity for rotary movement, in the interior of the stator 2, said rotor having, in the simplified illustration in FIG. 1a, two rotor poles 6 which are arranged opposite one another. In practice, synchronous machines can have more than two rotor poles, for example four or eight rotor poles.

A control unit 10 is provided which drives the stator windings 4, for example with the aid of a driver circuit 11. The driving is performed with the aid of electronic commutation, with the result that a phase voltage is applied to each of the phase windings 4 depending on the position of the rotor 5. By virtue of the control unit 10, different types of commutation can be provided, such as block commutation or trapezoidal commutation or the like, for example. In addition to the electronic commutation, a determined phase voltage can be produced by pulse width modulation of an applied intermediate circuit voltage or supply voltage.

In order to ascertain the induced voltage, it has until now been necessary to switch a phase connection of the electric machine 1 to the deenergized state and to ascertain and evaluate the voltage which is present there and is induced in the phase winding connected thereto. This generally takes place in fixed blanking intervals with a limited duration in order to exert as little influence as possible on the driving of the electric machine 1.

Alternatively, the induced voltage can also be determined by virtue of the phase voltages $\check{U}_s$ and the phase currents $\check{\imath}_s$ being determined at the phase connections. The phase voltages $\check{U}_s$ and the phase currents $\check{\imath}_s$ can be determined, for example, by measurement. The measurement of the phase voltages $\check{U}_s$ and the phase currents $\check{\imath}_s$ is performed by suitable measuring devices 12, which can be provided either in the driver circuit 11 or in the control unit 10. The measuring devices 12 can have, for example, measuring resistors (shunts), analog-to-digital converters or the like. Alternatively, the phase voltages $\check{U}_s$ and the phase currents $\check{\imath}_s$ can be ascertained from a measurement or knowledge of an intermediate circuit voltage (supply voltage) present at the driver circuit 11 and the duty factor of the pulse width modulation with which the associated phase winding is driven.

Correspondingly, the induced voltage $\check{U}_{ind}$ is determined from the phase voltages $\check{U}_s$ and the phase currents $\check{\imath}_s$. In vector notation, the following applies:

$$\overline{U}_{ind} = \overline{U}_S - R \cdot \overline{I}_S - [L]\frac{d\,i_S}{dt}$$

It has proven to be particularly advantageous to represent the induced voltage $\check{U}_{ind}$ as a rotating voltage vector of a stator-fixed coordinate system, in particular a Cartesian coordinate system. This is illustrated schematically in FIG. 1b, with the stator 2 having two stator windings 4 offset through 90° with respect to one another as an equivalent circuit diagram. The two equivalent stator windings 4 which are arranged on the stator 2 offset through 90° with respect to one another serve to clarify the fact that the stator windings 4 in a polyphase electric machine, as is illustrated by way of example in FIG. 1a, can always also be represented in a stator-fixed coordinate system, i.e. on an electric machine with stator windings which are offset through 90° with respect to one another. In the above example, the induced voltage of the stator-fixed Cartesian coordinate system with polar representation can be ascertained as follows from the indications of the induced voltages $U_{ind1}$, $U_{ind2}$, $U_{ind3}$ in the three-phase system:

$$\check{U}_{ind} = U_{ind} \cdot e^{-j\varphi} = U_{ind1} \cdot e^{-j0°} U_{ind2} \cdot e^{j120°} + U_{ind3} \cdot e^{-j240°}$$

The space vector angle φ of the induced voltage ascertained in accordance with the above formula then directly represents the rotor position of the rotor 5.

A precondition for this is that the induced voltage $\check{U}_{ind}$ as a sinusoidal profile. The induced voltage $\check{U}_{ind}$ is to a considerable extent dependent on the design of the electric machine, in particular on the shape of the air gap between the rotor poles 6 and the stator teeth 3. In order to ascertain the actual rotor position $\phi'$, therefore, a correction needs to be carried out in the case of a non-sinusoidal induced voltage. For this purpose, for example, a correction angle $K(\phi)$ which is dependent on the space vector angle can be provided, which correction angle is applied to the space vector angle of the non-sinusoidal induced voltage $\breve{U}_{ind}$ in order to correct this angle with respect to the armature position. The correction results in the correction angle $K(\phi)$ also being applied to the space vector angle $\phi$ of the non-sinusoidal voltage in positionally dependent fashion.

In addition to the space vector angle $\phi$, the rotation speed n of the electric machine can be taken into consideration since the induced voltage $\breve{U}_{ind}$, in particular the profile thereof, is likewise dependent on the rotation speed n. The provision of the correction angle $K(\phi, n)$ is generally performed using a lookup table, which is either learned in motor-individual fashion after manufacture of the electric machine 1 or is input depending on the motor type.

The rotation speed n can be determined in a variety of ways. In accordance with a first possibility, the rotation speed n can be determined as a derivative of the armature position $\phi'$. In this case, however, there is the disadvantage that there is feedback involved in the calculation since $\phi'=\phi+K(\phi, n)$. Under some circumstances, this can result in a fluctuation in the indication of the rotation speed n.

Alternatively, the rotation speed n can be ascertained as a quotient $$n=|U_{ind}|/|Km(\phi' \text{ or } \phi)|$$

where Km corresponds to the motor constant dependent on the position angle.

In accordance with a further improvement, the rotation speed n can be ascertained as follows:

$$n=|Uind|/|Km'|$$

where Km' corresponds to a filtered $Km(\phi'$ or $\phi)$. For this purpose, the same filter is applied to $Km(\phi$ or $\phi)$ as is also applied to $U_{ind}$ when it is ascertained. The filter which is applied to $U_{ind}$ results, for example, from the type of measurement (for example digital sampling) and determination of $U_{ind}$. By differentiation of the phase current with respect to dt, low-pass filtering is effected, for example, by the finite dt.

The learning process can take place, for example, by virtue of the phase potentials in the deenergized case, i.e. when no phase voltages are applied, being ascertained for determined rotor positions $\phi'$ and rotation speeds n and it therefore being possible for a profile of the induced voltage $\breve{U}_{ind}$ depending on the rotor position and the rotation speed n to be detected. The correction angle $K(\phi, n)$ results from the difference between the rotor position $\phi'_{meas}$ and the space vector angle of the ascertained induced voltage $\breve{U}_{ind\_meas}$ given a determined rotor position $\phi'_{meas}$ and a determined rotation speed $n_{meas}$.

$$K(\varphi_{meas}, n_{meas}) = \varphi'_{meas} - \arg(U_{ind\_meas} \cdot e^{j\varphi_{meas}})$$

FIG. 2 shows a flow chart illustrating the method for ascertaining the rotor position of an electric machine 1. In step S1, first the induced voltages at the phase connections via which the phase windings 4 are energized are ascertained. For this purpose, the applied phase voltages and the corresponding phase currents are detected and the induced voltages ascertained in accordance with the above formula. From this, the induced voltage at the corresponding phase connection is ascertained.

In step S2, the induced voltages thus ascertained for each phase are converted into a stator-fixed Cartesian coordinate system and a magnitude of the induced voltage and a space vector angle for the instantaneous rotor position are obtained.

In step S3, the corresponding correction angle $K(\phi, n)$ is applied (added) to the space vector angle $\phi$ of the induced voltage $U_{ind} \cdot e^{-jwx}$, which corresponding correction angle is ascertained from a lookup table or corresponding to a predetermined function.

The corrected space vector angle $\phi'$ $$\phi'=\phi-K(\phi,n)$$

is calculated in step S4. The corrected space vector angle $\phi'$ corresponds to the rotor position or the rotor position can be derived therefrom with a simple offset.

The invention claimed is:

1. A method of energizing phase connections of a rotary, polyphase, electronically commutated electric machine (1), having a plurality of phase windings (4), which is energized via the phase connections by ascertaining an armature position, said method comprising the following steps:
    determining phase voltages and phase currents at phase connections of the electric machine (1) using the phase voltages or a measured intermediate circuit voltage;
    ascertaining induced voltages at the phase connections of the electric machine (1) from the determined phase voltages and phase currents;
    providing a voltage vector of the induced voltages with respect to a stator-fixed Cartesian coordinate system, said voltage vector being determined by the induced voltages;
    determining the armature position as a space vector angle of the voltage vector of the induced voltages;
    determining a correction angle based on the space vector angle and the rotation speed of the armature;
    applying the correction angle to the space vector angle to provide a corrected space vector angle; and
    energizing the phase connections based on the corrected space vector angle.

2. The method as claimed in claim 1, wherein the provided voltage vector is carried out by virtue of the ascertained induced voltages being converted into the stator-fixed Cartesian coordinate system.

3. The method as claimed in claim 1, wherein the correction angle is determined using a lookup table by inputting the space vector angle and the rotation speed.

4. The method as claimed in claim 1, wherein the determination of the phase voltages and the phase currents at the phase connections of the electric machine (1) is carried out by virtue of the phase voltages and phase currents being measured.

5. A non-transitory computer readable medium which contains a program code which, when run on a data processing unit, carries out the following steps in the method as claimed in claim 1:
    receiving indications of the phase voltages and phase currents at phase connections of the electric machine (1);
    ascertaining the induced voltages at the phase connections of the electric machine (1) from the received phase voltages and phase currents;
    providing the voltage vector of the induced voltages with respect to a stator-fixed Cartesian coordinate system, said voltage vector being determined by the induced voltages; and
    determining the armature position as a space vector angle.

6. The method as claimed in claim 1, wherein the provided voltage vector is carried out by virtue of the determined phase voltages and phase currents at the phase connections of the electric machine (1) being converted into the stator-fixed Cartesian coordinate system before the induced voltages are ascertained from said determined phase voltages and phase currents.

7. The method as claimed in claim 1, wherein the correction angle is determined with the voltage vector angle.

8. The method as claimed in claim 1, wherein the correction angle is determined with the rotation speed of the armature.

9. The method as claimed in claim 1, wherein the correction angle is determined with a lookup table by inputting the voltage vector angle.

10. The method as claimed in claim 1, wherein the correction angle is determined with a lookup table by inputting the rotation speed of the armature.

11. The method as claimed in claim 1, wherein the determination of the phase voltages and the phase currents at the phase connections of the electric machine (1) is carried out by virtue of the phase voltages being ascertained from a provided intermediate circuit voltage and a duty factor for a pulse width modulation with which the phase connections are driven.

12. A device for ascertaining an armature position of a rotary, polyphase, electronically commutated electric machine (1), wherein the electric machine (1) has a plurality of phase windings, which are energized via phase connections, said device comprising:
   an apparatus configured to determine phase voltages and phase currents at phase connections of the electric machine (1) using measured phase voltages or a measured intermediate circuit voltage;
   a control unit, configured
      to ascertain induced voltages at the phase connections of the electric machine (1);
      to provide a voltage vector of the induced voltages with respect to a stator-fixed Cartesian coordinate system, said voltage vector being determined by the induced voltages;
      to determine the armature position as a voltage vector angle of the voltage vector of the induced voltages;
      to determine a correction angle based on the space vector angle and with the aid of the rotation speed of the armature; and
      to apply the correction angle to the space vector angle.

13. A motor system comprising a rotary, polyphase, electronically commutated electric machine (1) and comprising the device as claimed in claim 12.

* * * * *